(12) United States Patent
Carao et al.

(10) Patent No.: US 12,524,556 B2
(45) Date of Patent: Jan. 13, 2026

(54) AUTOMATED MACHINE LEARNING PATTERN MATCHING ACCESS RIGHTS ENGINE

(71) Applicant: Wells Fargo Bank, N.A., San Francisco, CA (US)

(72) Inventors: Alejandro J. Carao, Atlanta, GA (US); Robert William Childress, Peoria, AZ (US); Jonathan Wayne Ingram, Covington, WA (US); Gokarna K C, Concord, NC (US); Suki Ramasamy, Chennai (IN); Tara R. Ross, Norwalk, IA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 294 days.

(21) Appl. No.: 18/307,626

(22) Filed: Apr. 26, 2023

(65) Prior Publication Data

US 2024/0362346 A1    Oct. 31, 2024

(51) Int. Cl.
   G06F 21/00    (2013.01)
   G06F 21/60    (2013.01)
   G06F 21/62    (2013.01)

(52) U.S. Cl.
   CPC ........ *G06F 21/604* (2013.01); *G06F 21/6218* (2013.01); *G06F 2221/2141* (2013.01)

(58) Field of Classification Search
   CPC ............... G06F 21/604; G06F 21/6218; G06F 2221/2141
   See application file for complete search history.

(56) References Cited

U.S. PATENT DOCUMENTS

| | | | |
|---|---|---|---|
| 7,313,827 B2 | 12/2007 | Kelley et al. | |
| 7,941,848 B2 | 5/2011 | Yadav et al. | |
| 7,945,951 B2 | 5/2011 | Yadav et al. | |
| 7,966,665 B1 | 6/2011 | Feeser et al. | |
| 8,904,551 B2 | 12/2014 | Balasubramanyan et al. | |
| 9,641,614 B2 | 5/2017 | Kuznetsov et al. | |
| 10,530,776 B2 | 1/2020 | Grant et al. | |
| 2005/0114523 A1 | 5/2005 | Barron et al. | |
| 2006/0036869 A1* | 2/2006 | Faught ................ G06F 21/6218 713/182 |
| 2007/0006321 A1 | 1/2007 | Bantz et al. | |
| 2013/0151466 A1 | 6/2013 | Skaria et al. | |

(Continued)

FOREIGN PATENT DOCUMENTS

WO    2019159056    8/2019

*Primary Examiner* — Michael M Lee
(74) *Attorney, Agent, or Firm* — SCHWEGMAN LUNDBERG & WOESSNER, P.A.

(57) ABSTRACT

A method may include receiving an event notification that a user identifier has been added to a project identifier in a database, the user identifier associated with resource access rights for a plurality of resources; querying a datastore for a first resource access patterns associated with the user identifier and the project identifier for a first period of time; inputting the first resource access patterns into a machine learning model; receiving an output from the machine learning model identifying a cluster identifier associated with user identifiers with similar access patterns as the first resource access patterns; and based on the output, modifying the resource access rights for the user identifier with respect to the project identifier

17 Claims, 5 Drawing Sheets

(56) References Cited

U.S. PATENT DOCUMENTS

| | | | |
|---|---|---|---|
| 2016/0267413 A1 | 9/2016 | Liang et al. | |
| 2018/0357105 A1* | 12/2018 | Rishabh | H04L 63/10 |
| 2020/0050784 A1* | 2/2020 | Ellam | G06F 21/6218 |
| 2021/0165901 A1* | 6/2021 | Chandrashekhar | H04L 63/102 |
| 2021/0174305 A1 | 6/2021 | Schornack et al. | |
| 2021/0216893 A1* | 7/2021 | Roden | G06N 5/04 |
| 2021/0250362 A1 | 8/2021 | Spurlock et al. | |
| 2021/0303714 A1 | 9/2021 | Yaghoobi et al. | |
| 2021/0383008 A1* | 12/2021 | Manasse | G06F 21/6218 |
| 2022/0232010 A1* | 7/2022 | Zhang | G06F 21/44 |
| 2023/0129276 A1* | 4/2023 | Satake | G06F 21/6218 726/26 |

* cited by examiner

AUTOMATED MACHINE LEARNING PATTERN MATCHING ACCESS RIGHTS ENGINE

BACKGROUND

In an organization, a user may be assigned various tasks. Each of the tasks may require that a user access several resources. A resource may be a file, an application, a database, physical access to a building etc. Generally, a user may request access to a needed resource by filling out a form, sending an email, etc., and obtaining the necessary approval. If approval is granted, access rights with respect to the resource may be modified to permit access to the requesting user.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawing.

DETAILED DESCRIPTION

Figure 1:
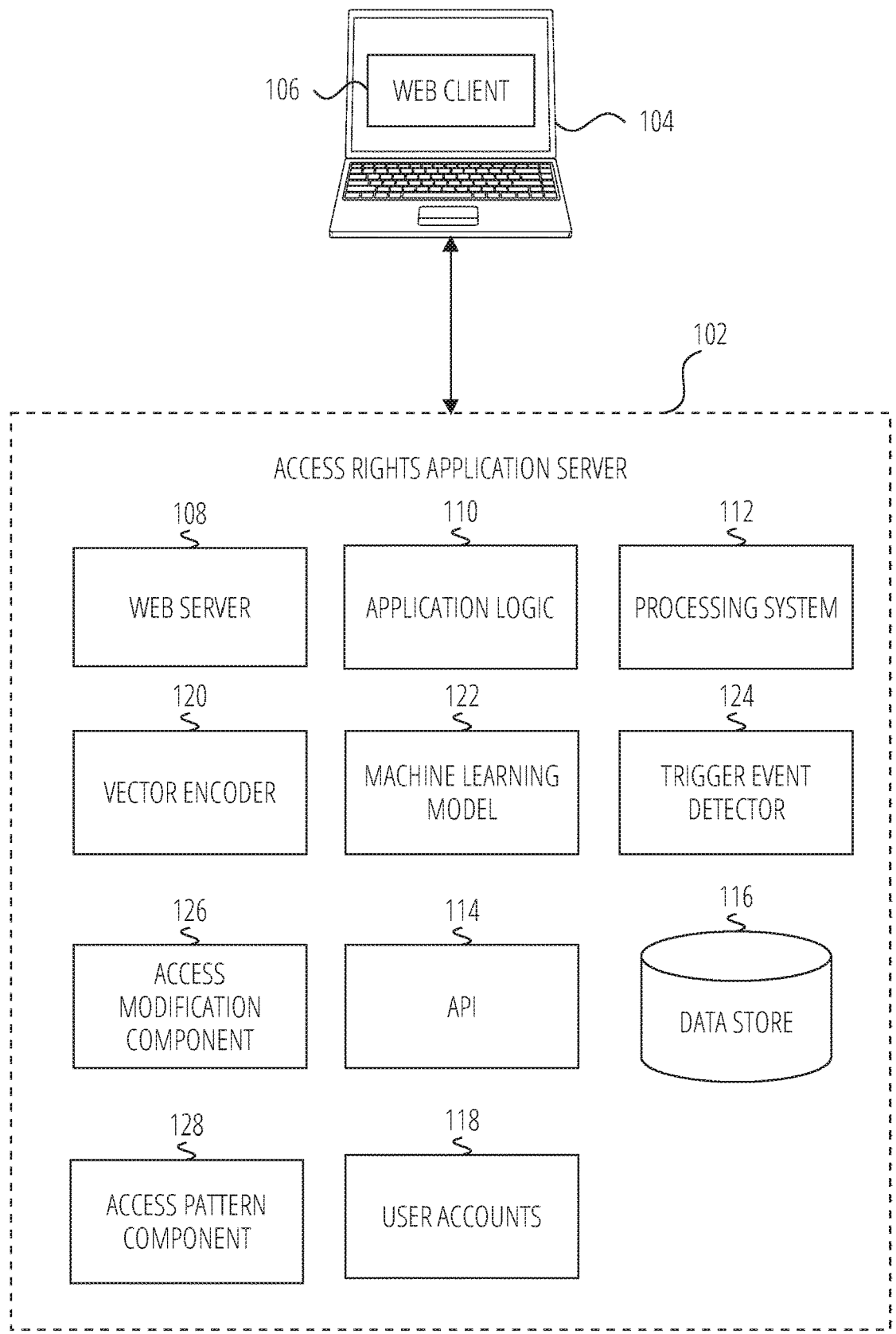
FIG. 1 is an illustration of elements of an access rights application server, according to various examples.

In the following description, for purposes of explanation, numerous specific details are set forth in order to provide a thorough understanding of some example embodiments. It will be evident, however, to one skilled in the art that the present invention may be practiced without these specific details.

Throughout this disclosure, electronic actions may be performed by components in response to different variable values (e.g., thresholds, user preferences, etc.). As a matter of convenience, this disclosure does not always detail where the variables are stored or how they are retrieved. In such instances, it may be assumed that the variables are stored on a storage device (e.g., Random Access Memory (RAM), cache, hard drive) accessible by the component via an Application Programming Interface (API) or other program communication method. Similarly, the variables may be assumed to have default values should a specific value not be described. User interfaces may be provided for an end-user or administrator to edit the variable values in some instances.

In various examples described herein, user interfaces are described as being presented to a computing device. Presentation may include data transmitted (e.g., a hypertext markup language file) from a first device (such as a web server) to the computing device for rendering on a display device of the computing device via a web browser. Presenting may separately (or in addition to the previous data transmission) include an application (e.g., a stand-alone application) on the computing device generating and rendering the user interface on a display device of the computing device without receiving data from a server.

Furthermore, the user interfaces are often described as having different portions or elements. Although in some examples these portions may be displayed on a screen at the same time, in other examples the portions/elements may be displayed on separate screens such that not all the portions/elements are displayed simultaneously. Unless explicitly indicated as such, the use of "presenting a user interface" does not infer either one of these options.

Additionally, the elements and portions are sometimes described as being configured for a certain purpose. For example, an input element may be described as configured to receive an input string. In this context, "configured to" may mean presentation of a user interface element that can receive user input. Thus, the input element may be an empty text box or a drop-down menu, among others. "Configured to" may additionally mean computer executable code processes interactions with the element/portion based on an event handler. Thus, a "search" button element may be configured to pass text received in the input element to a search routine that formats and executes a structured query language (SQL) query with respect to a database.

Managing access rights to enterprise resources (files, systems, website pages) has several challenges. Often the change in access rights requires requesting access—in some cases multiple requests—and waiting for a response. One challenge with a reactive approach such as this is that many times a user does not know they need access to a resource. For example, they may believe they already have access to it, or are not aware that a project they are working requires access to the resource. Furthermore, it is generally not only a single resource a user needs authorization for but may be several. Thus, the user will need to send multiple requests—one for each resource. In time critical situations—such as fixing security problems—requesting access may lead to loss of company data or services being down for a longer period than necessary.

Another problem with users needing to request access is that it may result in incorrect or incomplete access rights. For example, in systems that rely on human request and approval there is the possibility that approval is given where it should not be. Conversely, access rights may be denied when they should be granted. An additional problem may occur when access should be revoked but has not been. For example, if a user completes a task or has left a company, they may no longer requires access to a resource—creating a possible security risk.

Furthermore, the needs of a user or group of users is not static. For example, a user may be accessing a first set of files regularly for a month and then a second set of files in another month. Additionally, there may be a group of users in which their resource usages are determined by an access control lists (ACL) that gives the users access to a set of files. But, as with a single user, the access patterns of the group may change. For example, the access control list may have ten resources, but two of the resources have not been accessed for the past month by the group. In such an instance, the access control list is broader than the requirements of the group.

Accordingly, an automated proactive system is described herein that alleviates the problems detailed above. For example, access patterns with respect to users may be automatically monitored, and when a different pattern is detected, access rights of the user may be automatically adjusted. Similarly, access patterns of similar groups—such as being in the same department, working on the same project identifier, having a same role title, etc.—and the rights of the entire group may be changed based on change in access patterns. Furthermore, certain triggers may be used to determine when access patterns should be checked again. For example, if a user switches departments, moves physical locations within an enterprise, or moves to a new role on a project, access rights may be updated.

FIG. 1 is an illustration of elements of an access rights application server, according to various examples. The illustration includes an access rights application server 102, a client device 104, a web client 106, a web server 108, an application logic 110, a processing system 112, an API 114, a data store 116, a user accounts 118, a vector encoder 120, a machine learning model 122, a trigger event detector 124, an access modification component 126, and an access pattern component 128.

Access rights application server 102 is illustrated as set of separate elements (e.g., vector encoder 120, machine learning model 122, trigger event detector 124, access modification component 126, access pattern component 128, etc.). However, the functionality of multiple, individual elements may be performed by a single element. An element may represent computer program code that is executable by processing system 112. The program code may be stored on a storage device (e.g., data store 116) and loaded into a memory of the processing system 112 for execution. Portions of the program code may be executed in a parallel across multiple processing units (e.g., a core of a general-purpose computer processor, a graphical processing unit, an application specific integrated circuit, etc.) of processing system 112. Execution of the code may be performed on a single device or distributed across multiple devices. In some examples, the program code may be executed on a cloud platform (e.g., MICROSOFT AZURE® and AMAZON EC2®) using shared computing infrastructure.

User accounts 118 may include user profiles on users of access rights application server 102. A user profile may include credential information such as a username and hash of a password associated with an enterprise. A user account may store digital characteristics of the user with respect to the user's work with the enterprise. For example, a user profile may include a role of the user (per project in some examples), a location (if the user gives access approval), a list of distribution lists (e.g., email lists) the user is a member of, the departments the user is a member of, currently assigned projects, employment status, electronic calendar events, etc. The user profile may also identify a list of resource access rights that the user has. The list may identify ACL identifiers instead of listing identifying individual resources. A resource may be, but is not limited to, a file, a physical location (e.g., building or room access), a software application—installed locally or network-accessible, a database, or a website page (e.g., a SharePoint page).

As part of the digital characteristics, access patterns may be observed and stored for use with machine learning model 122. Access pattern component 128 may be monitor user electronic telemetry data with respect to resource usage. The telemetry data may include, but is not limited to, opening a resource, requesting access to a resource, and duration of a use of a resource. Each piece of telemetry data may also include a resource identifier and a timestamp.

Instead of, in addition to, being stored in the user profile, resource access rights may be stored on disparate systems. For example, there may be a server (not shown) that manages physical access rights. Accordingly, on the server there may be an access control list (ACL) that includes identifiers for physical locations and the user identifiers of authorized users. Similarly, there may be a file management server that maintains ACLs for files used by the enterprise.

Client device 104 may be a computing device which may be, but is not limited to, a smartphone, tablet, laptop, multi-processor system, microprocessor-based or programmable consumer electronics, game console, set-top box, or another device that a user utilizes to communicate over a network. In various examples, a computing device includes a display module (not shown) to display information (e.g., in the form of specially configured user interfaces). In some embodiments, computing devices may comprise one or more of a touch screen, camera, keyboard, microphone, or Global Positioning System (GPS) device.

Client device 104 may be used by a user to access the resources of the enterprise. For example, client device 104 may be used to access files for a project the user is working on. Client device 104 may also be used to review their access rights and respond to requests to grant access to resources.

Client device 104 and access rights application server 102 (and other access right management servers) may communicate via a network (not shown). The network may include local-area networks (LAN), wide-area networks (WAN), wireless networks (e.g., 802.11 or cellular network), the Public Switched Telephone Network (PSTN) Network, ad hoc networks, cellular, personal area networks, or peer-to-peer (e.g., Bluetooth®, Wi-Fi Direct), or other combinations or permutations of network protocols and network types. The network may include a single Local Area Network (LAN) or Wide-Area Network (WAN), or combinations of LAN's or WAN's, such as the Internet.

Access rights may be authorized in several ways. As discussed above, one method may be for a user to manually request access. For example, the user may receive a request denied message on a resource, and then the user may email their supervisor (or the user in charge of the resource) to obtain access. In some instances, a user may request access via a website (e.g., right-click on a resource and request access). Some resource types may have dedicated web applications where a user may request access, such as a building access web application.

Access rights application server 102 may use different mechanisms for authorizing resources. For example, access modification component 126 may automatically initiate requests to the relevant users or systems. In some examples, the communication from access modification component 126 may occur using an application programming interface (API) such as API 114. An API provides a method for computing processes to exchange data. A web-based API (e.g., API 114) may permit communications between two or more computing devices such as a client and a server. The API may define a set of HTTP calls according to Representational State Transfer (RESTful) practices. For example, A RESTful API may define various GET, PUT, POST, DELETE methods to create, replace, update, and delete access right data stored in a database (e.g., data store 116).

Accordingly, access modification component 126 may generate a change access right electronic message application programming interface (API) call. The API call may include parameters of an identification of the resource; a user identifier; and a request to authorize (or revoke access to) the user identifier to access the resource. The API call may be transmitted to the server associated with managing the resource (e.g., access rights application server 102).

Trigger event detector 124 may monitor changes in a user profile that may be used to initiate changes in access rights. Trigger events may be, but are not limited to, a user being added/removed, a user being added/removed from a distribution list, a user being terminated from their position, a change in role, a change in department, a change in a location of a calendar invite, etc. Trigger events may also be based on time. For example, periodically (e.g., over a week or month) access rights may be updated.

Trigger event detector 124 may be implemented in several manners, such as by using webhooks, periodic requests for new data, daily updates, etc. Webhooks are a way for web applications or systems to communicate with each other in real-time. For example, in the context of adding a user to an email distribution list, a webhook may be set up to notify an application, such as trigger event detector 124, whenever this action occurs.

The process may begin with the user being added to the email distribution list, either manually or through an automated process. Then, the email distribution service sends a request to a webhook URL, which has been pre-configured by trigger event detector 124. The payload (e.g., a JavaScript Object Notation (JSON) message) of the webhook received may include information about the event that occurred-in this case, the user being added to the email distribution list, the user identifier, and an email distribution list identifier. Similar webhooks may be used by trigger event detector 124 for other events such as a user being removed from a distribution list, changing roles, etc.

Once the event is detected, trigger event detector 124 may transmit a message to access modification component 126 to modify an access right for the affected user. The access rights may be determined based on an output of machine learning model 122. Machine learning model 122 is discussed further in the context of FIG. 2.

Access rights application server 102 may include web server 108 to enable data exchanges with client device 104 via web client 106. Although generally discussed in the context of delivering webpages via the Hypertext Transfer Protocol (HTTP), other network protocols may be utilized by web server 108 (e.g., File Transfer Protocol, Telnet, Secure Shell, etc.). A user may enter in a uniform resource identifier (URI) into web client 106 (e.g., the INTERNET EXPLORER® web browser by Microsoft Corporation or SAFARI® web browser by Apple Inc.) that corresponds to the logical location (e.g., an Internet Protocol address) of web server 108. In response, web server 108 may transmit a web page that is rendered on a display device of a client device (e.g., a mobile phone, desktop computer, etc.).

Additionally, web server 108 may enable a user to interact with one or more web applications provided in a transmitted web page. A web application may provide user interface (UI) components that are rendered on a display device of client device 104. The user may interact (e.g., select, move, enter text into) with the UI components, and based on the interaction, the web application may update one or more portions of the web page. A web application may be executed in whole, or in part, locally on client device 104. The web application may populate the UI components with data from external sources or internal sources (e.g., data store 116) in various examples. For example, a web application may be a file rights web application or a physical access rights web application.

The web application may also be used by users to view their currently assumed cluster(s) and the access rights associated with the cluster(s). Consider that a user if part of three clusters (as output by machine learning model 122). A table may be presented that includes each cluster identifier and the number (and type) of resources a user is authorized to use based on being part of the cluster identifier. For example, cluster '1' may be associated with an ACL that grants access to ten files, one physical building location, and two databases. A user may activate (e.g., click) on a cluster identifier to view details—name of file, etc.—on resources associated with the cluster identifier.

Instead of a table, a graphical representation may be used. For example, circles may be presented, one for each cluster. The relative size of each circle (or other shape) may be based on the number of resources a user is authorized to access for the associated cluster. The circles may overlap or be arranged concentrically based on the overlap of associated resources. For example, consider that cluster '1' is associated with resources [A, B, C] and cluster '2' is associated with resources [A, B]. Then, the circle for cluster '1' would be an outer circle and the circle for cluster '2' would be the inner circle. Similarly, a cluster '3' associated with rights [A, E, G] may be presented as overlapping in part with the circle of cluster '1'.

The web application may also be used by a user to modify ACLs and approve/deny resource authorization requests. For example, consider that a user is a project lead and as such manages authorization for a set of resources. Requests may be transmitted to the user from access modification component 126 to authorize one of more of these resources. The web application may present the requests in a table or other form with user interface elements to approve/deny the requests.

A further feature of the web application may be to modify an ACL for a cluster. For example, as described in more detail below, access patterns of a cluster of users may indicate that certain resources in the ACL for the cluster are no longer being used. As such, access modification component 126 may transmit a request to modify the ACL for the cluster to remove those resources from the ACL for the cluster (or added in other examples). The user may approve/deny such requests via the web application.

The web application may be executed according to application logic 110. Application logic 110 may use the various elements of access rights application server 102 to implement the web application. For example, application logic 110 may issue API calls to retrieve or store data from data store 116 and transmit it for display on client device 104. Similarly, data entered by a user into a UI component may be transmitted using API 114 back to the web server. Application logic 110 may use other elements (e.g., vector encoder 120, machine learning model 122, trigger event detector 124, access modification component 126, access pattern component 128 etc.) of access rights application server 102 to perform functionality associated with access rights application server 102, such as described above.

Data store 116 may store data that is used by access rights application server 102. For example, data store 116 may store user accounts 118, machine learning model 122, and resource groupings for clusters of similar users. The resource grouping may be stored in an ACL data structure, for example. Data store 116 is depicted as singular element but may in actuality be multiple data stores. The specific storage layout and model used in by data store 116 may take a number of forms—indeed, a data store 116 may utilize multiple models. Data store 116 may be, but is not limited to, a relational database (e.g., SQL), non-relational database (NoSQL) a flat file database, object model, document details model, graph database, shared ledger (e.g., blockchain), or a file system hierarchy. Data store 116 may store data on one or more storage devices (e.g., a hard disk, random access memory (RAM), etc.). The storage devices may be in standalone arrays, part of one or more servers, and may be located in one or more geographic areas.

Data structures may be implemented in several manners depending on a programming language of an application or database management system used by an application. For example, if C++ is used the data structure may implemented as a struct or class assistance. In the context of a relational database, a data structure may be defined in a schema. Additionally, when a data structure is characterized as "indicating" or "identifying" it may mean the variable (if in a struct) or cell (if a table) holds the value.

Figure 2:
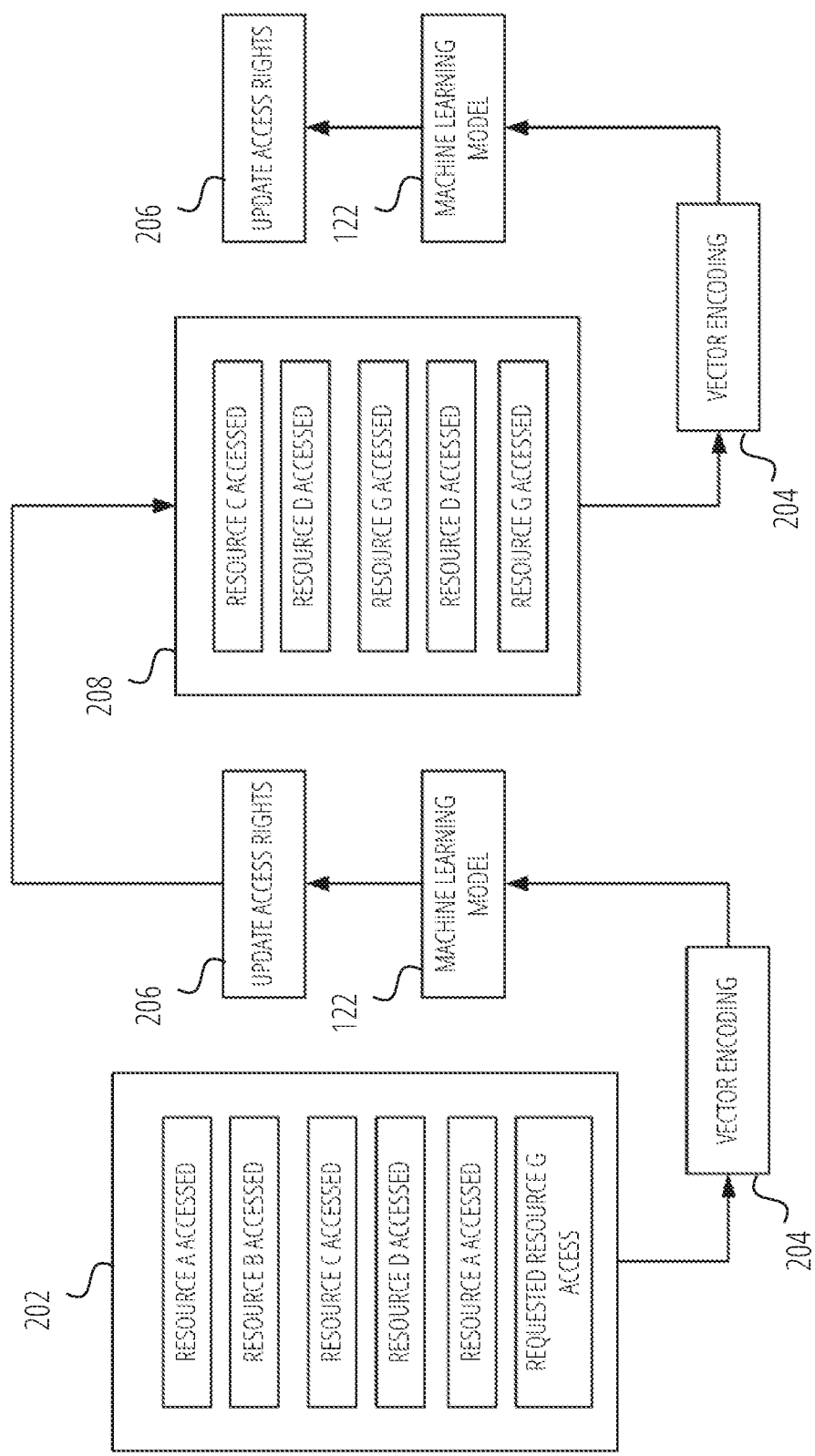
FIG. 2 is a visual representation of updating access rights, according to various examples.

FIG. 2 is a visual representation of updating access rights, according to various examples. The visual representation includes a machine learning model 122, a resource access pattern 202, a vector encoding operation 204, an update access rights operation 206, and a resource access pattern 208.

As indicated above, digital characteristics of a user may be used to find clusters of similar users. One aspect of those digital characteristics may include resource access patterns. A resource access pattern may be considered the set of actions taken with respect to resources over a period of time. The period of time may be fixed (e.g., a day), or based on a number of actions (e.g., 10 actions). A descriptive abstraction of resource access patterns is presented in FIG. 2 as resource access pattern 202 and resource access pattern 208. With respect to resource access pattern 202, it is observed that a user has accessed resources A, B, C, D and requested access to resource G. And with respect to resource access pattern 208, the user has accessed resources C, D, G, but is longer accessing resources A and B.

Vector encoding operation 204 represents the operation of converting the digital characteristics, including the resource access patterns into a format for inputting into machine learning model machine learning model 122. For example, many machine learning models only accept numerical data. Accordingly, an email distribution such as "support@acme.com" would not be an acceptable input to a neural network or unsupervised learning algorithm.

One technique for converting an email distribution list (or other resource) to a numerical format is using one-hot encoding in which each distribution list is assigned an element position of a vector that is the length of the total number of distribution lists—e.g., <distribution list A, distribution list B, distribution list C . . . distribution list N>. Thus, a vector input for an email distribution element may be <1, 1, 0 . . . 0> if the user was part of list A and list B, but no others.

Another technique is to use word embeddings. Word embeddings are dense vectors that represent words in a high-dimensional space. These embeddings may be learned in a training process using a training corpus set (e.g., resource names, role names, product descriptions, etc., of an enterprise) or existing word embeddings sets may be used. The word embeddings capture the semantic relationships between words. For example, the term "King" and "Queen" may be close in vector space—Euclidian distance or cosign similarity—relative to terms "King" and "Tree."

The vector that is ultimately inputted to machine learning model 122 may be the concatenation of several elements, which may each be a vector themselves. For example, there may be the distribution element (such as described above), a department element, a role element, a project element, etc. Accordingly, an example format for the input vector may be:

<<distribution list vector>, <role vector>, <location vector>, <department vector>, <project vector>, <resource access pattern vector>>

The resource access pattern vector may itself be a vector of vectors of individual data points. A data point may be associated with an electronic user interaction with a resource such as opening a resource, requesting access to a resource, etc. Each resource may have an identifier, which may be stored in a database (e.g., data store 116). Accordingly, one manner in which a data point for the resource access pattern vector may be formed is <user identifier, resource identifier, access type, timestamp>. Access types may be opening a file, requesting access to the file, etc., and use a one-hot encoding scheme, in various examples.

Another consideration that may be taken into consideration with machine learning model is to have a standardized vector length. To account for this consideration, vector padding or truncating may be used. For example, consider that the machine learning model is configured to accept 1000 data points for a resource access pattern and that the time period has been set to one week. A user, however, may not have 1000 interactions over a week. In such instances each vector element beyond the number that the user actually had may be set to 0. Similarly, if there are over 1000, the extra data points may be left off—or the more recent ones may be kept, and the early resource interactions may be removed.

Other resource access pattern vector formats may be used as well. For example, instead of (or in addition to) to each interaction generating each owns data point, a summary data point may be used. The summary data point may include the number of accesses of a resource during the time period, the average length of time the resource was open for, how many authorization requests were made, etc. The summary data may be retrieved via an API request to a file management server, in various examples.

For example, consider the data in resource access pattern 202. The data may be summarized as <<Resource A, 2, 1>, <Resource B, 1, 1>, <Resource C, 1, 1>, <Resource D, 1, 1>, Resource G, 1, 2>> in which the second element of each sub-vector relates to the number of accesses and the third element is the type of access according to a one-hot encoding. Thus, '1' may represent actually accessed (e.g., opened) and '2' is requested access.

The output of machine learning model 122 may depend on the type of machine learning model used and its associated hyperparameters (e.g., configuration). For example, if a neural network is used, the output may be an output vector-the length of which corresponds to a chosen number of similarity clusters. Accordingly, if the machine learning model used labeled training data that grouped users into 1000 groups, the output would be a 1000 vector output.

Each element of the output vector may be a probability score (e.g., 0 to 1) that the inputted vectorized digital characteristics match other users in the group corresponding to the vector location. For example, the output vector may be <0.95, 0.01, 0.5 . . .>. Thus, the user may be a 95% match to the group associated with the first location in the vector, but only a 1% match to the second. To come up with an initial set of labeled training data for a neural network, a project id may be used as a proxy for the cluster. Thus, there may be an output node for each project identifier.

Machine learning model 122 may be an unsupervised learning model such as k-means clustering. A data point in k-means clustering may be an n-dimensional vector that includes the features used in the ultimate comparison. Next, a number of clusters (k) may be chosen (e.g., 1000). One way to select 'k' is by using the elbow method, which involves plotting the within-cluster sum of squares (WCSS) against the number of clusters and selecting the number of clusters at the elbow point. The k-means clustering algorithm starts by randomly selecting 'k' initial cluster centroids. Then, it iteratively assigns each data point to the nearest centroid and updates the centroids based on the mean of the data points in the cluster until convergence.

A cluster may also be associated with an ACL as discussed previously. Accordingly, using the cluster identifiers output by machine learning model 122, update access rights operation 206 may be performed using access modification component 126. This operation may include making a comparison between access rights of the user and the access rights of the cluster identifier as stored in an ACL.

If a resource is authorized for the cluster identifier, access modification component 126 may automatically request that access be given to the user. Conversely, if a resource is not authorized in the cluster identifier, access modification component 126 may automatically transmit a request to have the user's access revoked. As discussed above, access modification component 126 may directly formatting an API call to have the access changed or transmit an email to another user (e.g., a supervisor or resource manager) to approve the request. In various examples, a bulk request may be made to clone the access rights of the cluster identifier to the user instead of iterating through to obtain the differences.

Data store 116 may store logic rules for when a user should automatically be given access to a resource as compared to an automated email message. For example, a resource may have a Bool value that indicates if it may be automatically authorized. Another rule may be that certain role title or departments may dictate if authorization may be automatically granted. Another rule may indicate that revoking access rights is performed via an API, but adding authorization is completed using an e-mail request.

In various examples, multiple machine learning models may be used in combination with each other. For example, there may be a machine learning model trained using project data as the input data without regard to additional information such as distribution lists, etc. Another machine learning model may be used for location resources. In this manner, the type of trigger event may dictate which machine learning model is run. For example, if a meeting invite changes location, the location machine learning model may be executed.

In various examples, the machine learning models may work together. For example, a k-means clustering algorithm may be used to identify the clusters. Then, training data may be compiled based on user characteristics within the clusters. Accordingly, the training data may include thousands of labeled pairs of <user digital characteristics, cluster identifier> pairs.

In various examples, the logic rules may be used in conjunction with the output of machine learning model 122. For example, the output vector of machine learning model 122 may indicate the user has a high degree (e.g., above 95%) of similarity between multiple groups. In such instances, the update access rights operation 206 may be performed once for each identified cluster. Conflicts between two ACLs—e.g., one having a resource authorized and another not—may be resolved according to the logic rules or transmitting a request to a user to resolve the conflict. For example, one rule may be that if at least one ACL has a resource, it should be part of the user's resource access rights. Another rule may be that a majority of the ACLs should have a resource if the user is to be given access.

Another logic rule may look at resource access pattern 202 and compare the resource overlap with stored ACLs. For example, consider an ACL that has resources [A, B, C, D, E]. In the example of FIG. 2, the user is already accessing 80% of the resources in the ACL. Accordingly, it may be inferred that the user will likely access resource E at some point in the future. A logic rule may have a condition that if the resource access pattern accesses at least 50% of an ACL's resources, update access rights operation 206 may grant authorization to the remainder—either automatically or with a request.

After update access rights operation 206 has been completed, a second resource access pattern 208 may be observed and encoded at vector encoding operation 204. The vector encoding operation 204 may be initiated based on a trigger event (e.g., trigger event detector 124) such as the user switching to a new role, being added to an email distribution list, etc. Vector encoding operation 204 may also be initiated periodically or after a certain number of user actions such as described previously. As seen, resource access pattern 208 no longer includes any actions with respect to resources A or B, but now is accessing resource G without needed to request access.

The result of the output of machine learning model 122 may be a new cluster identifier for the user. Update access rights operation 206 may then retrieve the set of access rights for resources associated with the ACL of the new cluster identifier. Then, one or more requests may be transmitted by access modification component 126 to update the access rights for resources with respect to the user.

The process depicted in FIG. 2 may also be used on a more granular level. For example, a project identifier may be associated with global ACL that includes child ACLs that each contain a subset of the resources. Such a situation may occur when, depending on a user's role, they only need access to a subset of the project's resources. Accordingly, a resource access pattern may be monitored just with respect to the project's resources. In such a manner, the system (e.g., access rights application server 102) may detect changes of a role of a user and grant new access to new resources and remove access to others.

Figure 3:
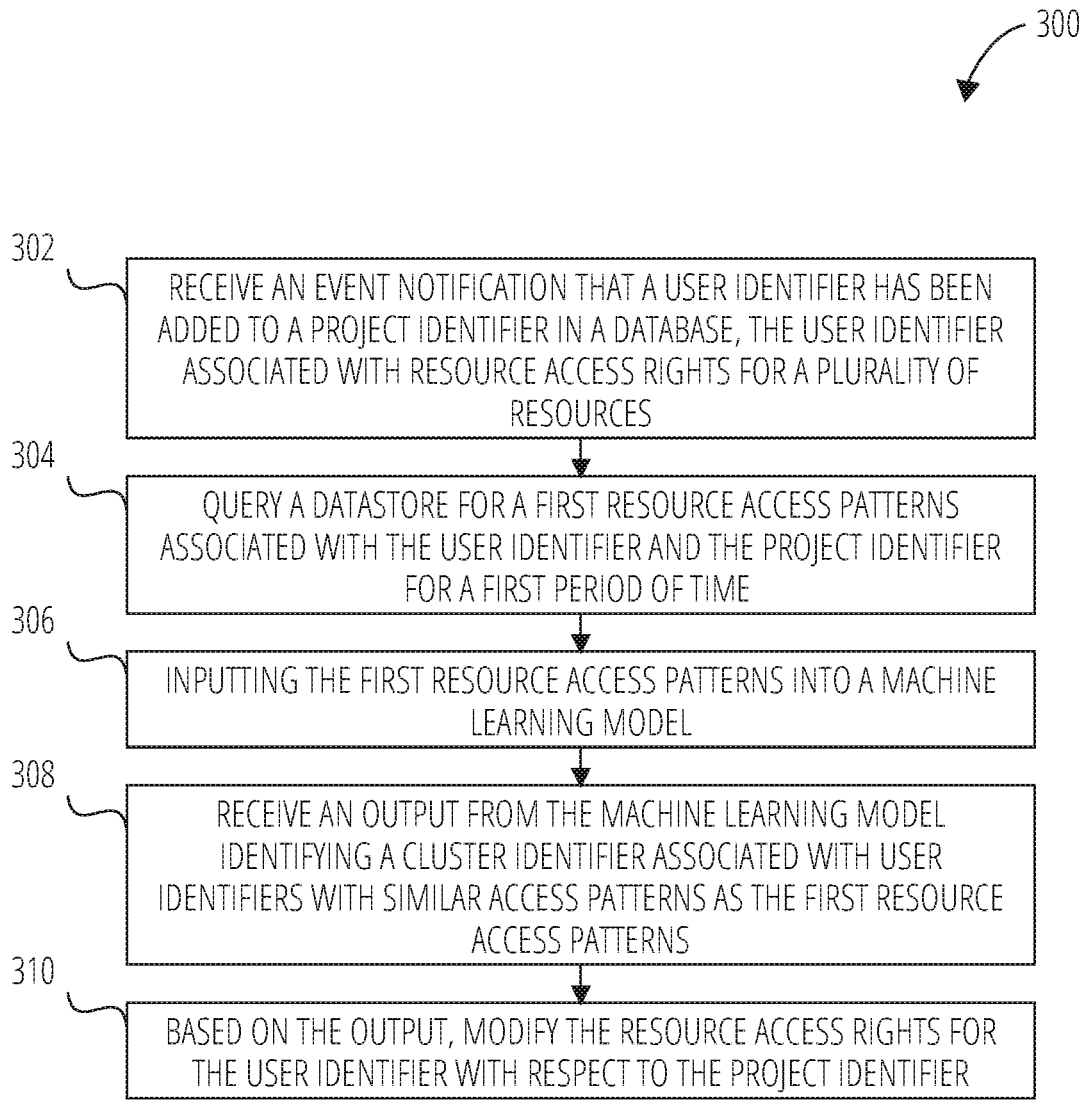
FIG. 3 is a flowchart of operations of a method to update access rights associated with a user identifier, according to various examples.

FIG. 3 is a flowchart of operations of a method to update access rights associated with a user identifier, according to various examples. The method is represented as a set of blocks that describe operations 302 to 310. The method may be embodied in a set of instructions stored in at least one computer-readable storage device of a computing device(s). A computer-readable storage device excludes transitory signals. In contrast, a signal-bearing medium may include such transitory signals. A machine-readable medium may be a computer-readable storage device or a signal-bearing medium. The computing device(s) may have one or more processors that execute the set of instructions to configure the one or more processors to perform the operations illustrated in FIG. 3. The one or more processors may instruct other component of the computing device(s) to carry out the set of instructions. For example, the computing device may instruct a network device to transmit data to another computing device or the computing device may provide data over a display interface to present a user interface. In some examples, performance of the method may be split across multiple computing devices using a shared computing infrastructure.

In operation 302, method 300 includes receiving an event notification that a user identifier has been added to a project identifier in a database, the user identifier associated with resource access rights for a plurality of resources. For example, access rights application server 102 may receive a webhook payload from trigger event detector 124.

In operation 304, method 300 includes querying a datastore for a first resource access patterns associated with the user identifier and the project identifier for a first period of time. Querying the datastore for the first resource access patterns associated with the user identifier and the project identifier for the first period of time may includes accessing user telemetry data identifying a resource and a last time of access for the resource. For example, an API call may be issued to a file rights server to receive events associated with resources for a project identifier such as stored in an ACL.

In operation 306, method 300 includes inputting the first resource access patterns into a machine learning model. Inputting may include encoding the first resource access patterns into a vector as discussed above with respect to vector encoding operation 204. Other digital characteristics may be encoded into the input vector as well.

In operation 308, method 300 includes receiving an output from the machine learning model identifying a cluster identifier associated with user identifiers with similar access patterns as the first resource access patterns. For example, the output may be a vector such that a position in the vector corresponds to a cluster identifier. The cluster identifier may in turn be associated with a group of users that have access to resources for the cluster identifier.

In operation 310, method 300 includes based on the output, modifying the resource access rights for the user identifier with respect to the project identifier. The method may also include where modifying the resource access rights for the user identifier with respect to the project identifier includes transmitting an API call with the user identifier, a resource identifier, and an add access command.

The method may also include collecting second resource access patterns associated with the user identifier and the project identifier for a second period of time subsequent to the first period of time. Then, the method may include inputting the second resource access patterns to the machine learning model and receiving a second output from the machine learning model identifying a cluster identifier. Based on the second output, modifying the resource access rights for the user identifier with respect to the project identifier (e.g., add or remove access when compared to the existing access rights of the user).

The method may also include querying the datastore for group access patterns associated with a plurality of user identifiers with respect to the project identifier for a second period of time and identifying a resource used in the group access patterns that is not authorized in the resource access rights for the user identifier. Then, the method may include modifying the resource access rights a second time for the user identifier to authorize the resource.

The method may also include querying the datastore for group access patterns associated with a plurality of user identifiers with respect to the project identifier for a second period of time and accessing a most recent time when a user identifier in the plurality of user identifiers has accessed the resource. Based on the most recent time being prior to a threshold amount of time (e.g., a week), the method may include modifying the resource access rights of the plurality of user identifiers to remove access to the resource.

The method may also include identifying the resource used in the group access patterns that is not authorized in the resource access rights for the user identifier includes accessing a most recent time when a user identifier in the plurality of user identifiers has accessed the resource, and based on the most recent time being within a threshold of the current time, initiating the modifying of the resource access rights for the second time. Other technical features may be readily apparent to one skilled in the art from the following figures, descriptions, and claims.

Figure 4:
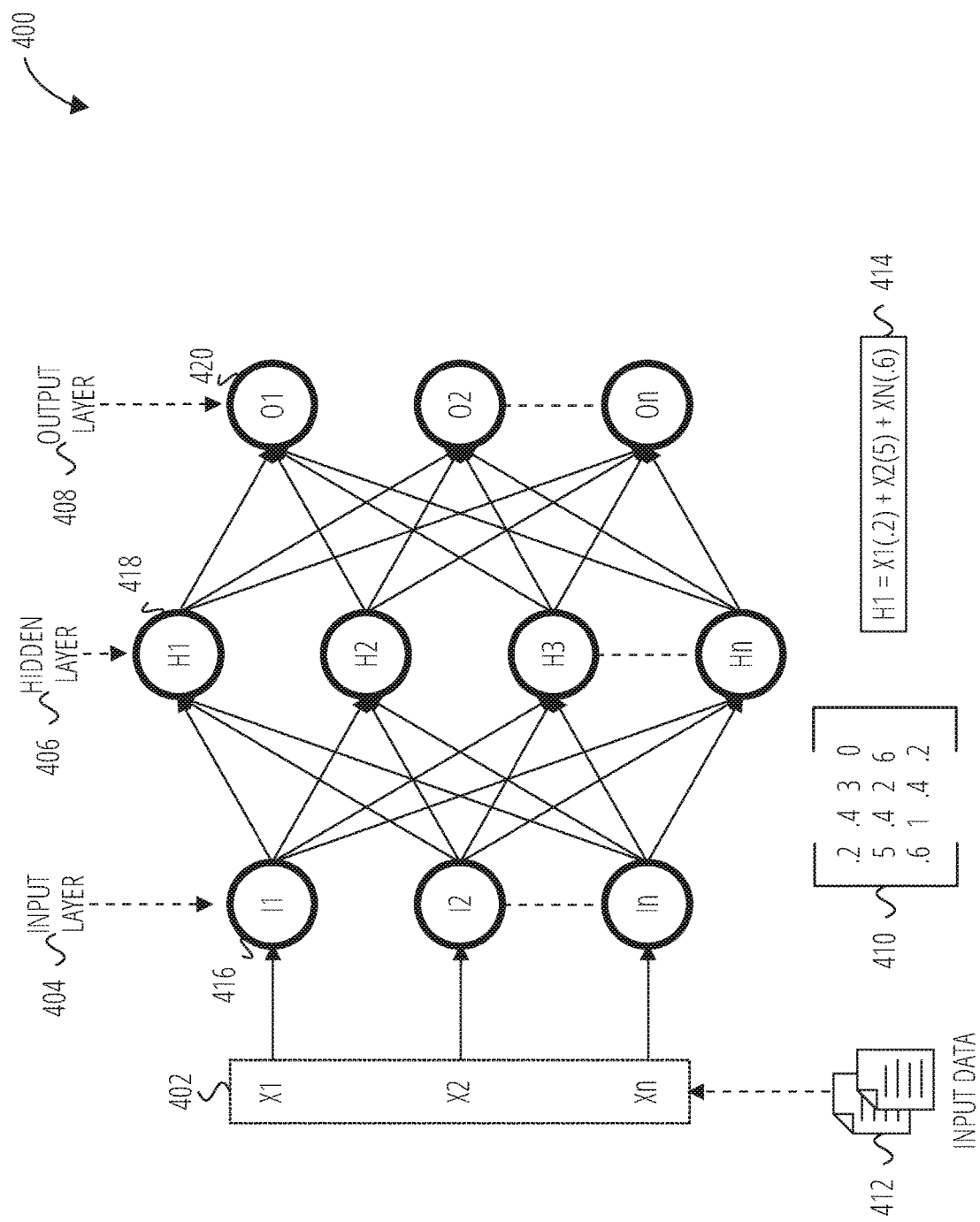
FIG. 4 illustrates an artificial neural network architecture, according to various examples.

FIG. 4 illustrates an artificial neural network 400 architecture according to various examples. Artificial intelligence (AI), machine learning (ML) algorithms, and neural networks are often used interchangeably, but they are better described as a set of nested concepts. Artificial intelligence may be considered the broadest concept and may be thought of as any program that attempts to perform a task/solve a problem that a human might such as facial recognition, classification, conversation, etc.

A subset of AI is ML. Machine learning encompasses different algorithms that are used to predict or classify a set of data used. In general terms, there are three types of ML algorithms: supervised learning, unsupervised learning, and reinforcement learning—sometimes a fourth, semi-supervised learning is also used.

Supervised learning algorithms may make a prediction based on a labeled data set (e.g., text with a rating of whether it is spam) and are generally used for classification, regression, or forecasting. Some examples of supervised learning algorithms are Naïve Bayes, Support Vector Machines, Linear Regression, Logistic Regression, Decision Trees, Random Forests, and K-Nearest Neighbor. Unsupervised learning algorithms may use an unlabeled data set (e.g., looking for clusters of similar data based on common characteristics). An example of an unsupervised learning algorithm is K-mean clustering. As discussed above, k-means clustering may be used to find clusters of users with similar digital characteristics.

Reinforcement learning algorithms generally make a prediction/decision, and then a user determines whether the prediction/decision was right-after which the machine learning model may be updated. This type of learning may be useful when a limited input data set is available.

Neural networks (also referred to an artificial Neural networks (ANN)) are a subset of ML algorithms that may be used to solve similar problems to those machine learning algorithms listed above. ANNs are computational structures that are loosely modeled on biological neurons. Generally, ANNs encode information (e.g., data or decision making) via weighted connections (e.g., synapses) between nodes (e.g., neurons). ANNs have many AI applications, such as automated perception (e.g., computer vision, speech recognition, contextual awareness, etc.), automated cognition (e.g., decision-making, logistics, routing, supply chain optimization, etc.), automated control (e.g., autonomous cars, drones, robots, etc.), among others.

Many ANNs are represented as matrices of weights that correspond to the modeled connections. Multiple matrices may be used when there are multiple layers. ANNs operate by accepting data into an input layer of neurons that often have many outgoing connections to neurons in another layer of neurons. One type of layer, a dense layer, is a layer in which each neuron in one layer is connected to each neuron in the next layer. If there are more than two layers, the layers between an input layer of neurons and an output layer of neurons are referred to as hidden layers. At each traversal between neurons, the corresponding weight modifies the input and may be tested against a threshold at the destination neuron. If the weighted value exceeds the threshold, the value is again weighted, or transformed through a nonlinear function, and transmitted to another neuron further down the ANN graph. If the threshold is not exceeded then, generally, the value is not transmitted to a down-graph neuron and the synaptic connection remains inactive. The process of weighting and testing continues until an output neuron is reached. The pattern and values of the output neurons constitutes the result of the ANN processing.

The correct (e.g., most accurate) operation of most ANNs relies on correct weights. However, ANN designers do not generally know which weights will work for a given application. Instead, a training process is used to arrive at appropriate weights. ANN designers typically choose a number of neuron layers or specific connections between layers including circular connection. A training process generally proceeds by selecting initial weights, which may be randomly selected.

Training data is fed into the ANN and results are compared to an objective function that provides an indication of error. The error indication is a measure of how wrong the ANN's result was compared to an expected result. This error is then used to correct the weights. Over many iterations, the weights will collectively converge to encode the operational data into the ANN. This process may be called an optimization of the objective function (e.g., a cost or loss function), whereby the cost or loss is minimized. The training data may be past labeled data sets in the same form as eventual input data. For example, the training data may be sets of user digital characteristics and cluster identifiers. The accuracy may be determined based comparing the actual output of the ANN to the correct output—e.g., the cluster identifier in the training data for a given set of digital characteristics.

A gradient descent technique is often used to perform the objective function optimization. A gradient (e.g., partial derivative) is computed with respect to layer parameters (e.g., aspects of the weight) to provide a direction, and possibly a degree, of correction, but does not result in a single correction to set the weight to a "correct" value. That is, via several iterations, the weight will move towards the "correct," or operationally useful, value. In some implementations, the amount, or step size, of movement is fixed (e.g., the same from iteration to iteration). Small step sizes tend to take a long time to converge, whereas large step sizes may oscillate around the correct value or exhibit other undesirable behavior. Variable step sizes may be attempted to provide faster convergence without the downsides of large step sizes.

Backpropagation is a technique whereby training data is fed forward through the ANN—here "forward" means that the data starts at the input neurons and follows the directed graph of neuron connections until the output neurons are reached—and the objective function is applied backwards through the ANN to correct the synapse weights. At each step in the backpropagation process, the result of the previous step is used to correct a weight. Thus, the result of the output neuron correction is applied to a neuron that connects to the output neuron, and so forth until the input neurons are reached.

With reference back to FIG. 4, the artificial neural network 400 is an example of a shallow neural network—as it has a single hidden layer. Neural networks with more than one hidden layer are considered deep learning machine learning models. If artificial neural network 400 is being trained, input data 412 may be a subset of historical data. When artificial neural network 400 is deployed for use, input data 412 may be the data that is being classified, etc.

The artificial neural network 400 comprises input values 402, an input layer 404, a hidden layer 406, an output layer 408, a weight matrix 410, input data 412, a neuron calculation 414, an input neuron 416, a hidden neuron 418, and an output neuron 420. As discussed in more detail with respect to FIG. 2, the input data for artificial neural network 400 may be labeled data sets of user digital characteristics.

However, as a conceptual walkthrough example of how a neural network functions, consider that artificial neural network 400 is used for determining a type of animal based on observable features of the animal such as height, weight, and color. Ultimately, the input to a neural network is in a numerical structure, a tensor. A tensor may have any number of dimensions. A zero-dimensional tensor is referred to as a scalar, a one-dimensional tensor is a vector, a two-dimensional tensor may be a matrix, and anything beyond three dimensions may just referred to as a tensor. The shape of a tensor may indicate the number of elements in each dimension.

In the example of animal classification, a vector may be used with three elements—one each for height, weight, and color. In FIG. 4, input values 402 may correspond to the height, weight, and color of an animal. Color, however, is not a numerical value and thus a conversion from a color to a number is used (e.g., brown is a one, red is a two, etc.). As an example, consider that a vector of [16, 7, 1] is an input vector for artificial neural network 400. Accordingly, input neuron 416 may be passed a value of 16. The input vector may in actuality be one output by vector encoding operation 204.

As indicated above, the connections between layers of neurons are represented as matrices. Weight matrix 410 is an example of weights between input layer 404 and hidden layer 406. Neuron calculation 414 identifies how the value of hidden neuron 418 may be calculated using weight matrix 410 with matrix multiplication. Using the example input vector above, the value of H1 may be [3.2+35+0.6]=38.8. The calculations for each of the other neurons in hidden layer 406 may be calculated in a similar way. The process of calculating values of output neuron 420 and the other output neurons may be made using another weight matrix (not shown).

Activation functions may be used as part of the value calculations of the hidden layer and output layer neurons. Different activation functions may be used depending on the problem that is trying to be solved. For example, for a binary classifier or multi-label classification a sigmoid activation may be used for the output layer. If the desired output is a multi-class classification than a SoftMax activation function may be used on the output layer. Other types of activation functions include, but are not limited to, Tanh, ReLu, Leaky ReLu, Binary step, Identity, and Swish.

Continuing the animal example, the number of output neurons in output layer 408 corresponds to the labeled number of animals—and because the animals are mutually exclusive—this is a multi-class classification style network. In FIG. 4, there are three output neurons indicating that this ANN outputs the probability with respect with three animal types, but an ANN may have thousands or tens of thousands or output neurons (in the case of cluster classification, the number may match the number of clusters). The value of each output neuron may indicate the probability of a classification of an animal type. For example, the value of output neuron 420 may be 0.99 indicating a 99% chance that the input vector corresponds to the animal corresponding to output neuron 420.

Figure 5:
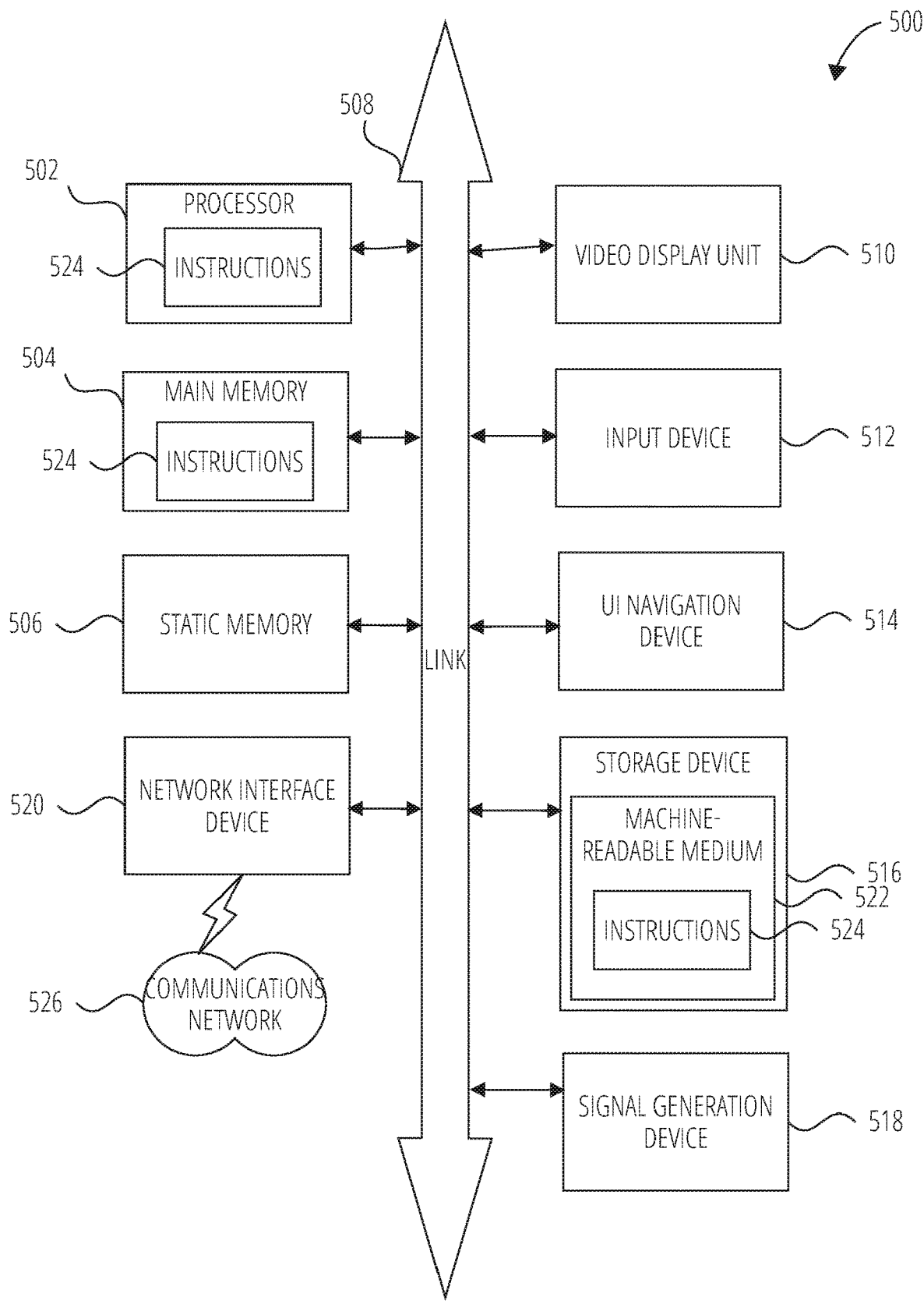
FIG. 5 is a block diagram illustrating a machine in the example form of a computer system, within which a set or sequence of instructions may be executed to cause the machine to perform any one of the methodologies discussed herein, according to various examples.

FIG. 5 is a block diagram illustrating a machine in the example form of computer system 500, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client Network environments, or it may act as a peer machine in peer-to-peer (or distributed) Network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 500 includes at least one processor 502 (e.g., a central processing unit (CPU), a graphics processing unit (GPU) or both, processor cores, compute nodes, etc.), a main memory 504 and a static memory 506, which communicate with each other via a link 508. The computer system 500 may further include a video display unit 510, an input device 512 (e.g., a keyboard), and a UI navigation device 514 (e.g., a mouse). In one embodiment, the video display unit 510, input device 512, and UI navigation device 514 are incorporated into a single device housing such as a touch screen display. The computer system 500 may additionally include a storage device 516 (e.g., a drive unit), a signal generation device 518 (e.g., a speaker), a network interface device 520, and one or more sensors (not shown), such as a global positioning system (GPS) sensor, compass, accelerometer, or other sensors.

The storage device 516 includes a machine-readable medium 522 on which is stored one or more sets of data structures and instructions 524 (e.g., software) embodying or utilized by any one or more of the methodologies or functions described herein. The instructions 524 may also reside, completely or at least partially, within the main memory 504, static memory 506, and/or within the processor 502 during execution thereof by the computer system 500, with the main memory 504, static memory 506, and the processor 502 also constituting machine-readable media.

While the machine-readable medium 522 is illustrated in an example embodiment to be a single medium, the term "machine-readable medium" may include a single medium or multiple media (e.g., a centralized or distributed Database, and/or associated caches and servers) that store the one or more instructions 524. The term "machine-readable medium" shall also be taken to include any tangible medium that is capable of storing, encoding, or carrying instructions for execution by the machine and that cause the machine to perform any one or more of the methodologies of the present disclosure or that is capable of storing, encoding, or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. A computer-readable storage device may be a machine-readable medium 522 that excluded transitory signals.

The instructions 524 may further be transmitted or received over a communications network 526 using a transmission medium via the network interface device 520 utilizing any one of a number of well-known transfer protocols (e.g., HTTP). Examples of communication networks include a local area Network (LAN), a wide area Network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

What is claimed is:

1. A method comprising:
   receiving an event notification that a user identifier has been added to a project identifier in a database, the user identifier associated with resource access rights for a plurality of resources;
   querying a datastore for a first resource access patterns associated with the user identifier and the project identifier for a first period of time, wherein the first resource access patterns include actions taken with respect to the plurality of resources during the first period of time, the first period of time subsequent to the receiving;
   inputting the first resource access patterns into a machine learning model;
   receiving an output from the machine learning model identifying a first cluster identifier associated with user identifiers with similar access patterns as the first resource access patterns;
   based on the output, modifying the resource access rights for the user identifier with respect to the project identifier;
   collecting second resource access patterns associated with the user identifier and the project identifier for a second period of time subsequent to the first period of time and the modifying, the second resource access patterns being different than the first resource access patterns;
   inputting the second resource access patterns to the machine learning model;
   receiving a second output from the machine learning model identifying a second cluster identifier different than the first cluster identifier; and based on the second output, modifying the resource access rights for the user identifier with respect to the project identifier.

2. The method of claim 1, further comprising:
 querying the datastore for group access patterns associated with a plurality of user identifiers with respect to the project identifier for a third period of time;
 identifying a resource used in the group access patterns associated with a plurality of user identifiers that is not authorized in the resource access rights for the user identifier; and
 modifying the resource access rights a third time for the user identifier to authorize the resource.

3. The method of claim 2, wherein identifying the resource used in the group access patterns that is not authorized in the resource access rights for the user identifier includes:
 retrieving from a database, a latest time when any user identifier in the plurality of user identifiers has accessed the resource; and
 based on the latest time being within a threshold of a current time, initiating the modifying of the resource access rights for the third time.

4. The method of claim 1, wherein modifying the resource access rights for the user identifier with respect to the project identifier includes:
 transmitting an API call with the user identifier, a resource identifier, and an add access command.

5. The method of claim 1, further comprising:
 querying the datastore for group access patterns associated with a plurality of user identifiers with respect to the project identifier for a third period of time;
 retrieving from a database, a latest time when any user identifier in the plurality of user identifiers has accessed the resource; and
 based on the latest time being prior to a threshold amount of time, modifying the resource access rights of the plurality of user identifiers to remove access to a resource.

6. The method of claim 1, wherein querying the datastore for the first resource access patterns associated with the user identifier and the project identifier for the first period of time includes:
 accessing user telemetry data identifying a resource and a last time of access for the resource.

7. A non-transitory computer-readable medium comprising instructions, which when executed by a processing unit, configure the processing unit to perform operations comprising:
 receiving an event notification that a user identifier has been added to a project identifier in a database, the user identifier associated with resource access rights for a plurality of resources;
 querying a datastore for a first resource access patterns associated with the user identifier and the project identifier for a first period of time, wherein the first resource access patterns include actions taken with respect to the plurality of resources during the first period of time, the first period of time subsequent to the receiving;
 inputting the first resource access patterns into a machine learning model;
 receiving an output from the machine learning model identifying a first cluster identifier associated with user identifiers with similar access patterns as the first resource access patterns;
 based on the output, modifying the resource access rights for the user identifier with respect to the project identifier;
 collecting second resource access patterns associated with the user identifier and the project identifier for a second period of time subsequent to the first period of time and the modifying, the second resource access patterns being different than the first resource access patterns;
 inputting the second resource access patterns to the machine learning model;
 receiving a second output from the machine learning model identifying a second cluster identifier different than the first cluster identifier; and
 based on the second output, modifying the resource access rights for the user identifier with respect to the project identifier.

8. The non-transitory computer-readable medium of claim 7, wherein the instructions, which when executed by the processing unit, further configure the processing unit to perform operations comprising:
 querying the datastore for group access patterns associated with a plurality of user identifiers with respect to the project identifier for a second-third period of time;
 identifying a resource used in the group access patterns associated with a plurality of user identifiers that is not authorized in the resource access rights for the user identifier; and
 modifying the resource access rights a third time for the user identifier to authorize the resource.

9. The non-transitory computer-readable medium of claim 8, wherein identifying the resource used in the group access patterns that is not authorized in the resource access rights for the user identifier includes:
 retrieving from a database, a latest time when any user identifier in the plurality of user identifiers has accessed the resource; and
 based on the latest time being within a threshold of a current time, initiating the modifying of the resource access rights for the third time.

10. The non-transitory computer-readable medium of claim 7, wherein modifying the resource access rights for the user identifier with respect to the project identifier includes:
 transmitting an API call with the user identifier, a resource identifier, and an add access command.

11. The non-transitory computer-readable medium of claim 7, wherein the instructions, which when executed by the processing unit, further configure the processing unit to perform operations comprising:
 querying the datastore for group access patterns associated with a plurality of user identifiers with respect to the project identifier for a third period of time;
 retrieving from a database, a latest time when any user identifier in the plurality of user identifiers has accessed the resource; and
 based on the latest time being prior to a threshold amount of time, modifying the resource access rights of the plurality of user identifiers to remove access to a resource.

12. The non-transitory computer-readable medium of claim 7, wherein querying the datastore for the first resource access patterns associated with the user identifier and the project identifier for the first period of time includes:
 accessing user telemetry data identifying a resource and a last time of access for the resource.

13. A system comprising:

a processing unit; and a storage device comprising instructions, which when executed at the processing unit, configure the processing unit to perform operations comprising:

receiving an event notification that a user identifier has been added to a project identifier in a database, the user identifier associated with resource access rights for a plurality of resources;

querying a datastore for a first resource access patterns associated with the user identifier and the project identifier for a first period of time, wherein the first resource access patterns include actions taken with respect to the plurality of resources during the first period of time, the first period of time subsequent to the receiving;

inputting the first resource access patterns into a machine learning model;

receiving an output from the machine learning model identifying a first cluster identifier associated with user identifiers with similar access patterns as the first resource access patterns;

based on the output, modifying the resource access rights for the user identifier with respect to the project identifier;

collecting second resource access patterns associated with the user identifier and the project identifier for a second period of time subsequent to the first period of time and the modifying, the second resource access patterns being different than the first resource access patterns;

inputting the second resource access patterns to the machine learning model;

receiving a second output from the machine learning model identifying a second cluster identifier different than the first cluster identifier; and based on the second output, modifying the resource access rights for the user identifier with respect to the project identifier.

14. The system of claim 13, wherein the instructions, which when executed by the processing unit, further configure the processing unit to perform operations comprising:

querying the datastore for group access patterns associated with a plurality of user identifiers with respect to the project identifier for a third period of time;

identifying a resource used in the group access patterns associated with a plurality of user identifiers that is not authorized in the resource access rights for the user identifier; and modifying the resource access rights a third time for the user identifier to authorize the resource.

15. The system of claim 14, wherein identifying the resource used in the group access patterns that is not authorized in the resource access rights for the user identifier includes:

retrieving from a database, a latest time when any user identifier in the plurality of user identifiers has accessed the resource; and based on the latest time being within a threshold of a current time, initiating the modifying of the resource access rights for the third time.

16. The system of claim 13, wherein modifying the resource access rights for the user identifier with respect to the project identifier includes:

transmitting an API call with the user identifier, a resource identifier, and an add access command.

17. The system of claim 13, wherein the instructions, which when executed by the processing unit, further configure the processing unit to perform operations comprising:

querying the datastore for group access patterns associated with a plurality of user identifiers with respect to the project identifier for a third period of time;

retrieving from a database, a latest time when any user identifier in the plurality of user identifiers has accessed the resource; and based on the latest time being prior to a threshold amount of time, modifying the resource access rights of the plurality of user identifiers to remove access to a resource.

* * * * *